Sept. 15, 1970    E. A. KOLM ET AL    3,529,216
REMOTE CONTROL SYSTEM UTILIZING A.C. TRANSMISSION LINES
Filed June 29, 1967    4 Sheets-Sheet 1

INVENTORS.
JOHN J. HARRIS
ERIC A. KOLM
BY
Gordon Needleman
ATTORNEY

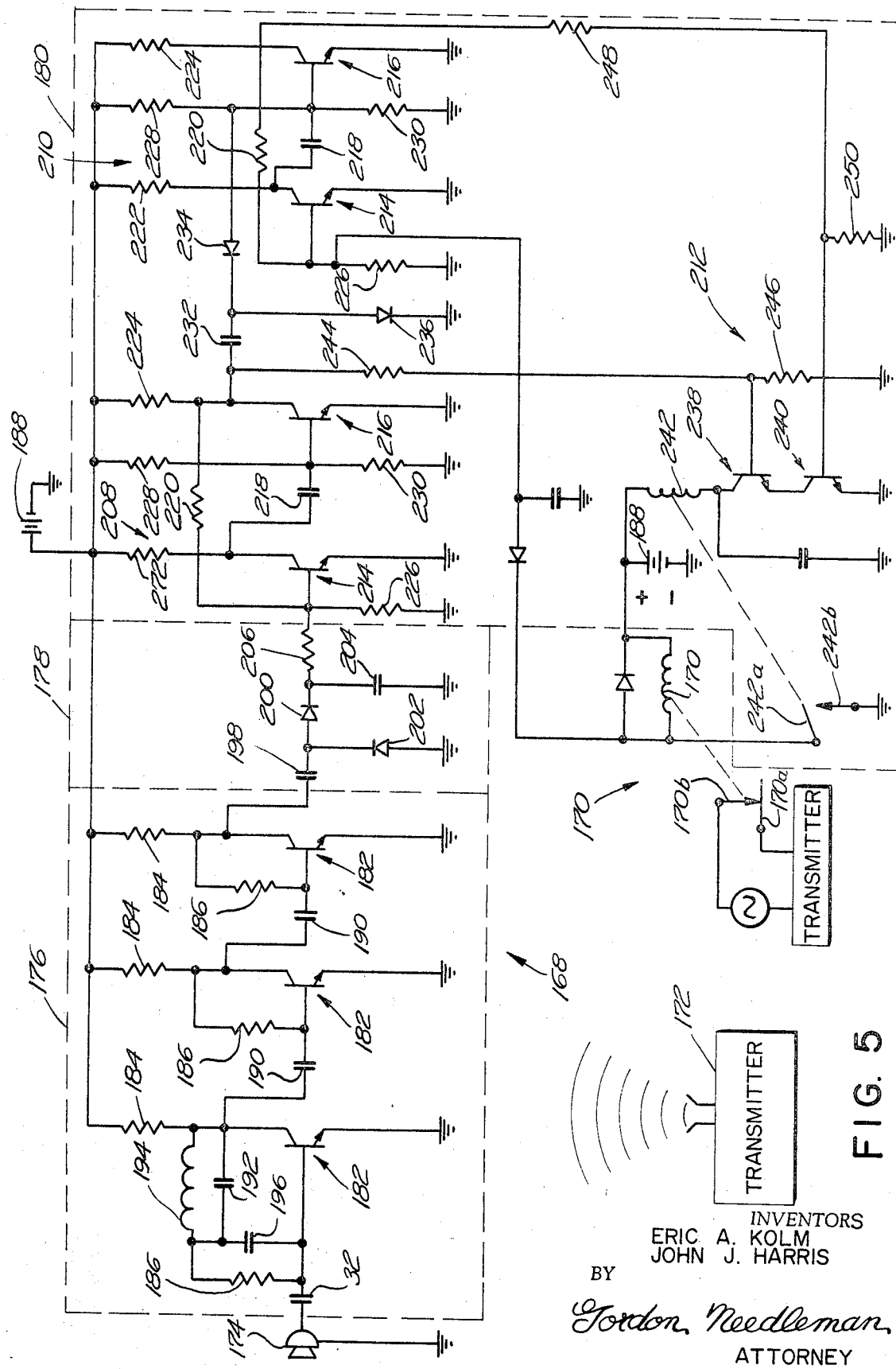

United States Patent Office 3,529,216
Patented Sept. 15, 1970

3,529,216
REMOTE CONTROL SYSTEM UTILIZING A.C.
TRANSMISSION LINES
Eric A. Kolm, Brookline, and John J. Harris, Millis,
Mass., assignors to Sonus Corporation, Natick, Mass.,
a corporation of Delaware
Filed June 29, 1967, Ser. No. 650,104
Int. Cl. H01h 47/20, 47/32, 51/32
U.S. Cl. 317—147
7 Claims

ABSTRACT OF THE DISCLOSURE

This invention is directed at a remote control system for appliances using a transmitter and a receiver utilizing A.C. lines such as are found in houses, factories or other wired buildings. Particularly and notably this invention deals with A.C. line transmission, which has completely overcome the well-known problems which have plagued all attempts in this field before and which rendered A.C. transmission practically useless for the system mentioned.

BACKGROUND OF THE INVENTION

A.C. transmission as known today has been limited to wireless "intercoms" with serious limitation, even in the intercoms, due to the static and general noisy conditions that prevail. In cases where A.C. transmission is used as a means of control, it is practically useless since inherent and ever present transient signals make the detection of a desired signal impossible with any degree of accuracy.

In order to transmit intelligence through existing A.C. power lines, one can either utilize filtering circuits of varying degrees and severity, which for all practical purposes is unfeasible (since if absolute filtering could be accomplished one's own signal would be eliminated by definition).

SUMMARY OF THE INVENTION

With the recognition of the problems met with heretofore, a system must be devised which is based on a firm conclusion, the inventors contend, that transients, pulses of varying nature, etc., can never be satisfactorily excluded enabling an A.C. power line to be sufficiently clear to permit precise and desired signals to be transmitted.

This invention therefore is based on the above conclusion and as will be set forth hereinafter is based on a principle which never requires the elimination or damping of any A.C. power line noise, but rather accepts this condition as normal and instead completely circumvents all problems which heretofore have rendered A.C. power lines unacceptable.

It is a known fact that all present central vacuum cleaning systems are equipped with separate switch wiring, throughout an entire installation, to every vacuum outlet. The inventors' device disclosed herein makes central vacuum cleaning systems economically feasible for the average homeowner, since under the old system the electrical wiring is frequently as expensive as the entire vacuum system cost.

SUMMARY OF THE INVENTION

It is an object of this invention to produce a remote control system for appliances and machinery which utilizes A.C. power lines in such a manner as to completely eliminate the age old problem of transients, pulses, and the like, from interfering with the precise desired control.

Another object of the present invention is not only to provide an A.C. transmission system for the control of transients, but also to provide a combination of A.C. transmission with audio transmission.

Still another object of the present invention is to specifically render central vacuum cleaning systems wire free.

A further object of this invention is to provide a remote control system utilizing A.C. transmission line which even under the most severe power line noise conditions will prevent undesired actuation of the appliance to be controlled.

The applicants' device utilizes a transmitter which sends a signal through the transmission or power lines found in a house or building wired for electricity. The signal is picked up by a receiver on the appliance turning on a control switch. The embodiments disclosed herein utilize a steady signal, which causes a switch change and then maintains that change until the signal terminates, which in turn causes the switch to go off.

Communicating systems utilize house transmission lines for carrying signals from a voice transmitter to a voice receiver, allowing two people in distant parts of a building to talk to each other. This system usually has built into it a means of filtering out continuous noise or signals which appear on the lines.

The device disclosed herein operates on the basis that the transmitter will send out a continuous signal which is passed through the transmission lines and picked up by the receiver. The frequency of the signal is predetermined and fixed within a controlled frequency band by electronic filters. The use of the continuous signal which causes the receiver to actuate a magnetic relay or the like will prevent, for the most part, accidental triggering of the receiver by spurious signals or noise. Even if a signal of the proper frequency should get into the system it will, at most, only momentarily actuate the relay, since the device will only operate as long as there is noise.

The non-modulated transmitter comprises generally a voltage reducing rectifying section, an oscillator and a transformer with coupling capacitors, which serve as an output and coupling section.

The non-modulated receiver comprises generally a rectifying section, an amplifying section, a detection section and a switching section.

The modulated transmitter comprises a voltage reducing and rectifying section, a low frequency oscillator section, a high frequency oscillator section and output section.

The modulated receiver system comprises generally a voltage reducing and rectifying section, an input and voltage amplifier section, a coding receiver generating section, a second amplifying section, a voltage doubler section, and a switching section.

DRAWINGS

FIG. 5 is a schematic diagram of an acoustically sensitive receiver used to actuate the RF transmitter of FIG. 1 in accordance with acoustical signals.

DESCRIPTION OF PREFERRED EMBODIMENTS

Figure 1:
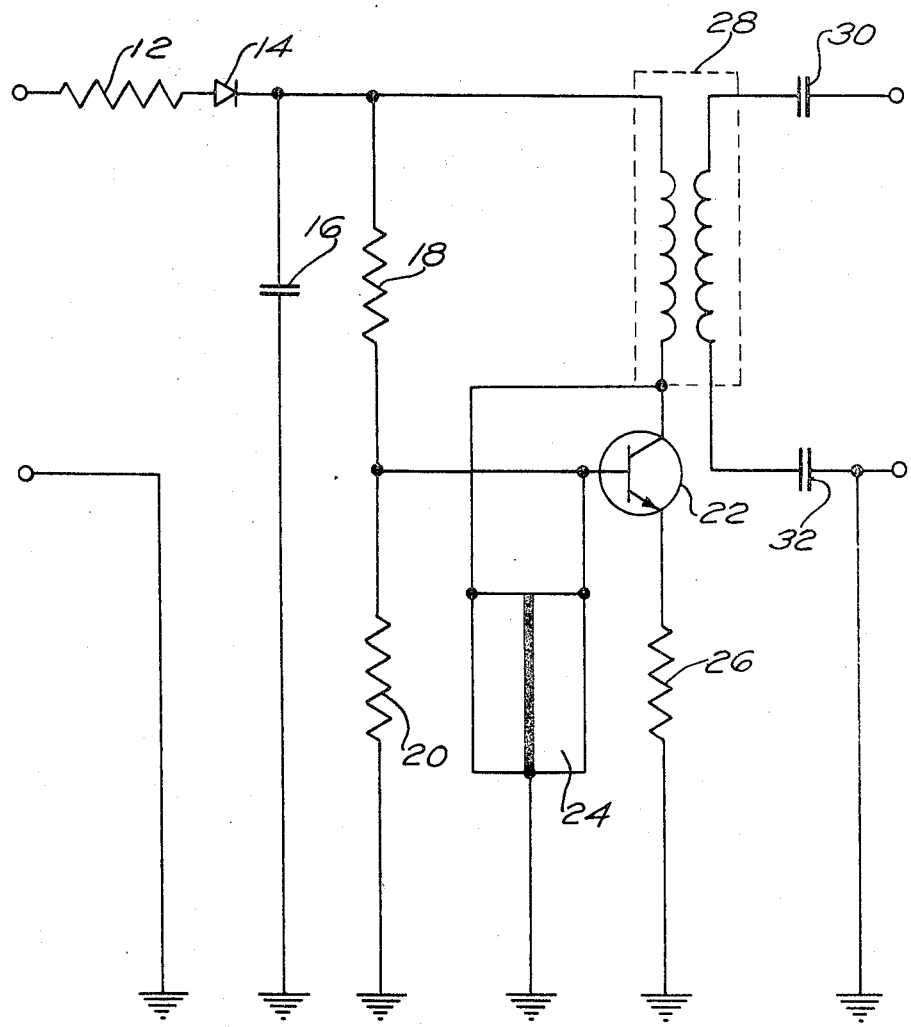
FIG. 1 is a schematic diagram of a non-modulated transmitter.

The transmitter is the type which is plugged into a house wall outlet and feeds a tone or pulse into the power line. The transmitter could be made a part of a circuit which allows it to be turned on by a switch or a switching device which is sonically actuated.

The transmitter system comprises a voltage dropping resistor 12 having a resistance of 2.2 kilohms, which reduces the 115 v. A.C. voltage to 50 v. The silicon diode 14 in series with the resistor 12 acts as a half wave rectifier converting the A.C. current to D.C. current. The capacitor 16 operates as a filter capacitor to provide a low reactance path to suppress A.C. ripple currents. The resistor 12 and the diode 14 along with the capacitor 16 make up a voltage reducing rectifying section. The capacitor 16 is of the dry electrolytic type having a nominal capacitance of 500 µf. It has a secondary function of somewhat smoothing out the pulsating D.C. leaving the diode 14. The rest of the transmitter comprises, generally speaking, an oscillator section including the filter 24, the transistor 22 and its resistor network and an output and coupling section which comprises the transformer 28 and the two capacitors 30, 32.

The pair of resistors 18, 20 having resistance of 120 kilohms and 10 kilohms respectively provide a voltage divider which acts to bias the base of the transistor 22. The ceramic filter 24 is used to select the proper predetermined frequency. The filter 24 has a nominal output of 262 kc. The resistor 26 having a nominal resistance of 820 ohms acts as a biasing resistor for the emitter of the transistor 22. The transistor 22 acts as an oscillator, which is self-excited and which has as its frequency determining element the ceramic filter 24. The regenerative feedback of the oscillating section is through the filter 24. The signal from the transistor 22 is fed into a step down transformer 28, having a pair of capacitors 30, 32, in circuit with it, which act to tune the transformer 28 and provide means of coupling the signal into the A.C. line. They also provide high impedance termination for the A.C. line.

Figure 2:
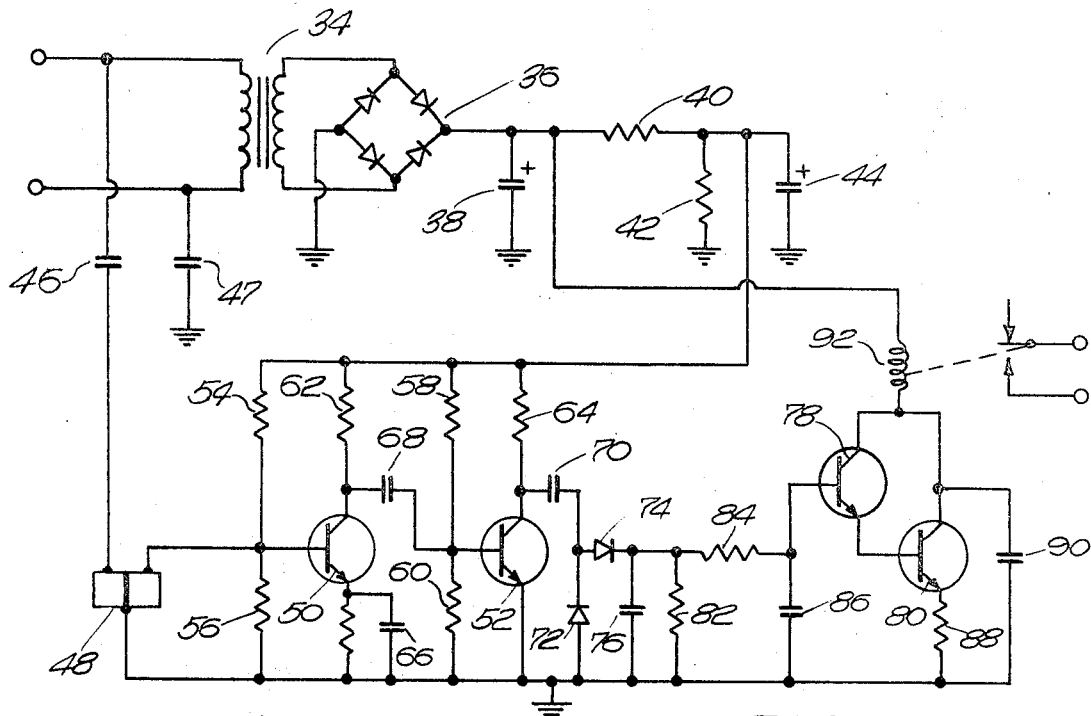
FIG. 2 is a schematic digaram of a non-modulated receiver.

The receiver shown in FIG. 2 is placed in the circuit of the appliance so that its relay will actuate the appliance when the signal is received through the transmission line to which it is electrically connected, for example by a plug. This receiver can be subdivided into a voltage reducing and rectifying section, an amplifying section, a rectifying and detecting section, a voltage doubling section and a switching section.

The receiver shown in FIG. 2 gets the incoming signal from the A.C. transmission line at 115 v. A.C. The 115 v. A.C. is reduced through the step down transformer 34 to 16 v. A.C. The alternating current is rectified to direct current by a bridge rectifier 36. The filter capacitor 38, having a capacitance of 500 µf. provides a low reactance path for the suppression of stray A.C. ripple currents. The pair of resistors 40, 42 having resistance of 560 ohms and one kilohm respectively function as a voltage divider. The filter capacitor 44 has the same function as the filter capacitor 38 and has a capacitance of 100 µf. The A.C. signal is simultaneously passed through a coupling capacitor 46 to a ceramic filter 48, which selects the predetermined frequency and also eliminates transmission line disturbances or noise. The ceramic filter 48 has an output of 262 kc. The D.C. voltage from the voltage divider and the A.C. signal from the ceramic filter 48 are passed into the amplifying portion of the receiver. The amplifier portion comprises two common emitter transistor stages using two transistors 50, 52 whose bases are biased by the resistors 54, 56 and 58, 60 respectively. The resistor 62 acts as a collector circuit load resistor for the transistor 50, and resistor 64 acts as a collector load resistor for the transistor 52. The resistors 54 and 58 have a resistance of 120K, the resistor 56 has a resistance of 15K, the resistor 62 has a resistance of 4.7K, the resistor 64 has a resistance of 2.2K and the resistor 60 has a resistance of 8.2K. The capacitor 47 is a by-pass capacitor and the resistor 51 is an emitter biasing resistor for the transistor 50.

The capacitor 66 acts as a by-pass capacitor for the emitter of the transistor 50. The capacitor 68 having a capacitance of 250 µf. acts as a coupling capacitor between the transistors 50 and 52. The signal is then passed through the coupling capacitor 70, which acts with the diodes 72, 74 and the capacitor 76 to provide a voltage doubler rectifier.

The capacitor 76 functions as a filter capacitor for the voltage doubler. The nominal capacitance of the capacitors 70, 76 are the same, in this case .01 µf. The switching portion of the receiver comprises a pair of transistors 78, 80 which operate a magnetic relay 92. The transistors 78 and 80 are used as a high sensitivity D.C. amplifier. The transistors 78, 80, individually, normally do not conduct enough current to operate relay 92. When a signal is applied to the base of the transistor 78 causing it to conduct, a signal is also applied to the transistor 80 causing it to conduct. The combination of both transistors conducting simultaneously causes the relay 92 to activate the switch contacts. The capacitor 86, having a capacitance of 20 µf., slows the switching reaction down, thereby requiring a steady signal to be present for proper operation. When a continuous signal is applied, it causes the capacitor 86 to charge up to the bias point set by the two resistors 82 and 84. When the bias point set by the resistors 82, 84, having resistances of 56K and 10K respectively, is exceeded, the transistors 78, 80 conduct quickly and heavily and the relay 92 acts without hesitation and without the possibility of a border line signal which may or may not trigger the switching section. The resistors 82, 84 act as base biasing resistors for the transistor 78. The resistor 88 is a current limiting resistor, so that strong signals will not cause transistors 78 and 80 to destroy themselves from over conduction. The capacitor 90, having a capacitance of 50 µf., acts to reduce transient signals from the relay 92, which provides the switching impetus turning the appliance off and on.

Figure 3:
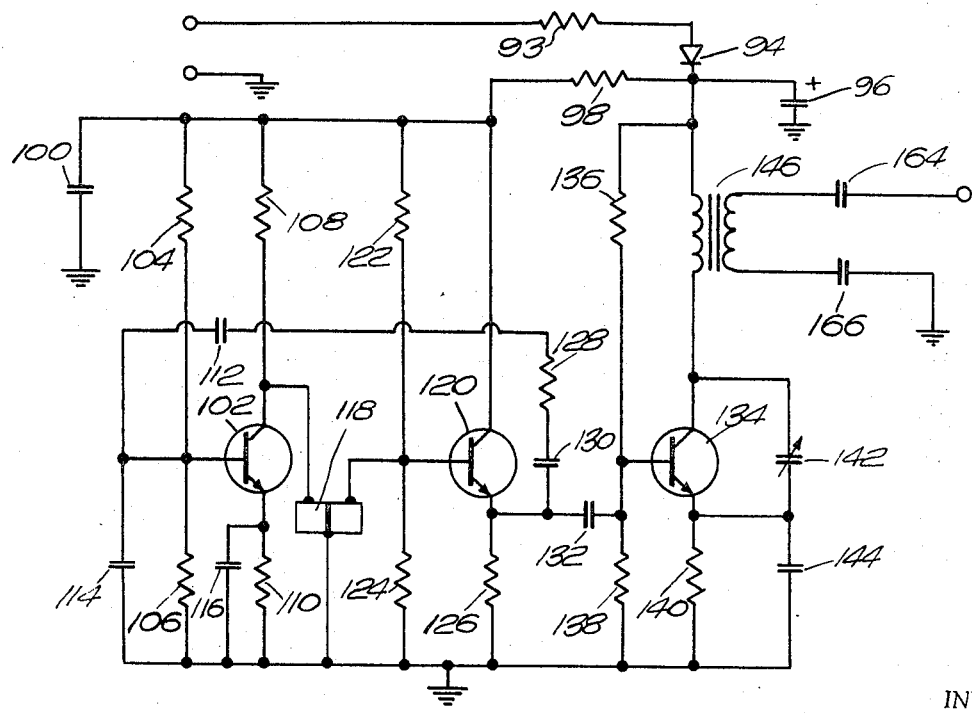
FIG. 3 is a schematic diagram of a modulated transmitter.
Figure 4:
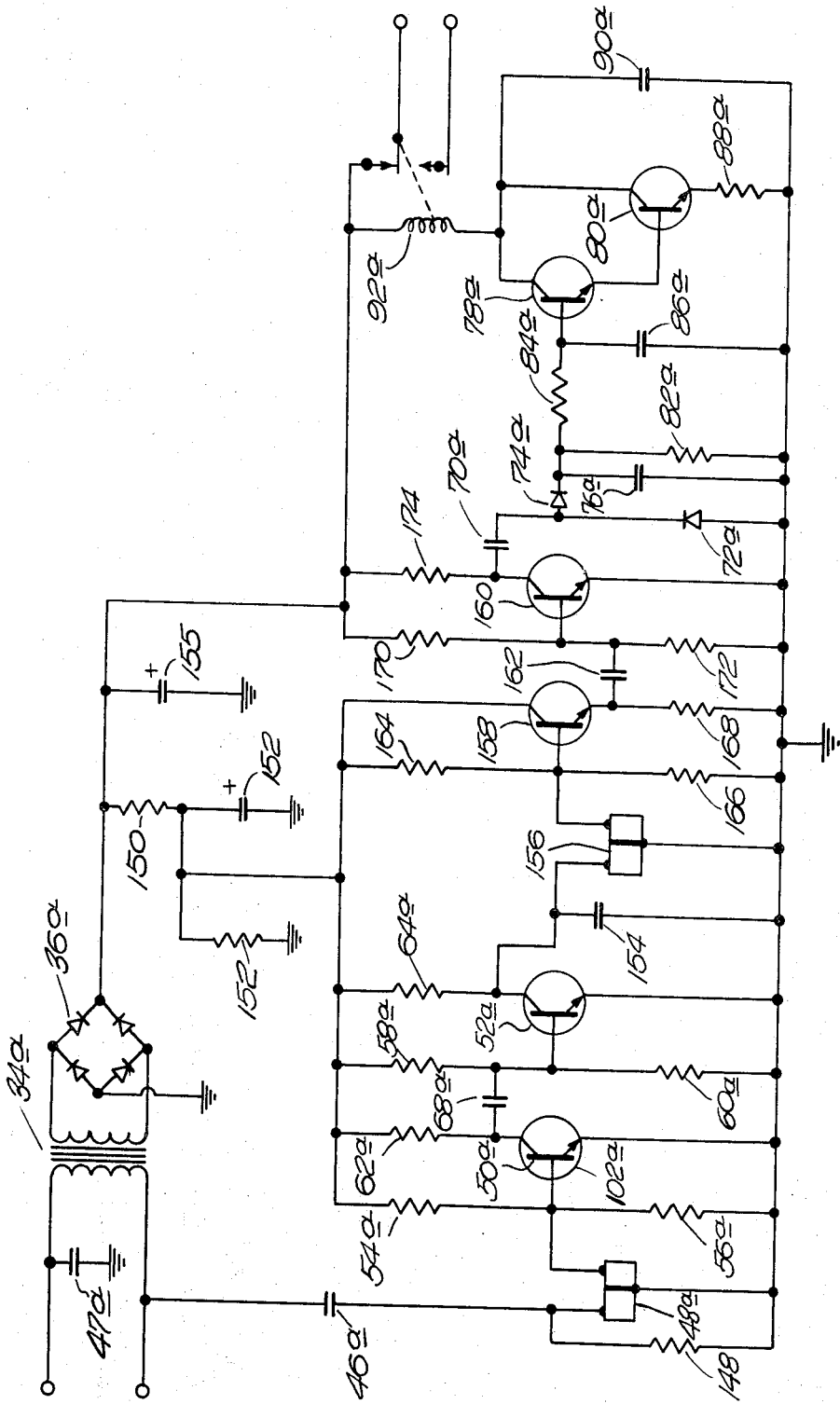
FIG. 4 is a schematic diagram of a modulated receiver.

Although the transmitting and receiving system set forth hereinbefore works satisfactorily, there is the possibility that spurious signals may get into the transmission line and accidentally actuate the switch in the receiver at the appliance. In order to avoid the danger of a spurious triggering of the switch due to noise, both the transmitter and receiver can be modulated. The system comprises the transmitter shown in FIG. 3, and the receiver shown in FIG. 4. The transmitter system in this case is also of the plug in type. The circuit starts with a voltage dropping resistor 92, having a resistance of 6.8K, which is in series with a silicon diode 94 functioning as a half wave rectifier with a positive output. A filter capacitor 96 of 100 µf. reduces the ripple current while freely passing the D.C. current. Another voltage dropping resistor 98 drops the voltage from 50 v. to 45 v. A branch of the system is tapped off to provide 50 v. to the output portion of the transformer 146. A second branch carries the current from the 45 v. section to the oscillator portion of the transmitter system.

The capacitor 100 of 500 µf. acts as a filter capacitor for the same purpose as the capacitor 96. The transistor 102 is the first of the two low frequency transistor oscillators which have an output of from 400 to 2,000 cycles. The resistors 104, 106 of 47K and 4.7K, are biasing resistors for the transistor 102. A resistor 108 provides a load to the collector and the resistor 110 biases the emitter of the transistor 102. The capacitors 112 and 114 are feedback and shaping capacitors to provide proper regenerative feedback for the transistor oscillators 102, 120. The capacitor 116 is an emitter by-pass capacitor. The ceramic filter 118 couples the transistor 102 to the transistor 120, which is the second transistor in the oscillator portion. The resistors 122, 124 are base biasing resistors for the transistor 120, while the resistor 126 is the emitter load. The transistor 120 is connected as an emitter follower. The resistor 128 functions as a feedback and phase-corrective resistor. The capacitor 130 is a feedback capacitor and the capacitor 132 functions as a coupling capacitor to couple the low frequency signal to the base of the high frequency oscillator and output transistor 134.

The high frequency oscillator and output transistor 134 provides the amplification in the system by functioning as an output transistor and also as a 262 kc. oscillator. The base of the transistor 134 is biased by the resistors 136, 138 and its emitter is loaded by the resistor 140. A variable capacitor 142, which has capacitances from 15 to 120 μf., and capacitor 144 act as feedback and tuning capacitors respectively for the 262 kc. oscillator. The collector of the transistor 134 is connected to a step down transformer 146. The low frequency signal coupled to the base of transistor 134 through capacitor 132 now modulates the 262 kc. oscillator made up of transistor 134 and previously described components. This modulated 262 kc. signal is developed across the primary, and coupled to the secondary of transformer 146. This signal is then coupled into the A.C. power line via two capacitors 164, 166, which also tune the secondary of transformer 146 and act as high impedance terminations for the A.C. power line. The modulated transmitter thus comprises generally a voltage reducing and rectifying section, the first two transistors 102, 120 functioning as a low frequency oscillator section. The transistor 134 acts as a high frequency oscillator, as a modulator and as an output transistor. It acts as an oscillator in that it oscillates at 262 kc. through the path of the variable capacitor 142 and the capacitor 144. The signal coming into the base of the transistor 134 modulates the oscillation, so that you have a signal at 262 kc. whose amplitude is varying at a frequency determined by the low frequency oscillator section and its resistor network. These two signals actually combine in transistor 134, the low frequency signal being applied to the base and the high frequency signal being common to the collector and back to the emitter. The signals are developed across the primary of the transformer 146 and fed out into the power line through previously described components.

The modulated receiver of the variation receives its power from the 115 v. A.C. power line and passes it through a power transformer 34a and then through a bridge rectifier 36a changing the 115 v. A.C. to 16 v. D.C. Another branch sends the modulated 262 kc. signal present on the 115 v. A.C. power line through a capacitor 46a, which couples the signal to a ceramic filter 48a, which has a resistor 148 in parallel with the input side of it. A branch of the D.C. power supply circuit is provided with the resistors 150 and 153 that act as a voltage divider to reduce D.C. voltage applied to the circuit. A capacitor 152 is used as a filter capacitor to reduce the A.C. ripple at this point and to reduce power supply coupling between various circuits in the receiver.

The incoming signal from ceramic filter 48a is passed into the first voltage amplifying section comprising a pair of transistors 50a, 52a, which are connected through a coupling capacitor 68a. The base of transistor 50a is biased by the resistors 54a, 56a and the resistor 62a functions as a collector circuit load resistor. The base of transistor 52a is biased by the resistors 58a and 60a with the resistor 64a functioning as a load resistor similar to the resistor 62a. A signal is then passed to a coding receiver generator 156 which detects the presence of the low frequency modulating signal, and generates a completely new low frequency signal that is fed directly to the base of the emitter follower transistor 158. Capacitor 154 is a tuning and by-pass capacitor which aids the coding receiver in its operation. The two resistors 164 and 166 provide base bias for transistor 158. Resistor 168 is the emitter load resistor for transistor 158. Capacitor 162 acts as a coupling capacitor to couple signal to base of transistor 160, which is a common emitter voltage amplifier. Resistors 170 and 172 set base bias for transistor 160, and resistor 174 is the collector load.

The receiver now has a circuitry similar to that of the unmodulated receiver described hereinbefore. There are the diodes 72a and 74a, which act as a voltage doubler rectifier, the capacitor 76a, which functions as a filter capacitor, the base biasing resistors 82a and 84a, which act on the transistor 78a. The capacitor 86a for slowing the switching action down and the capacitor 90a and the relay 92a, as well as the emitter biasing resistor 88a, are also all found in the unmodulated receiver and perform the same functions.

As stated hereinbefore, the transmitter of either the modulated or non-modulated type can be controlled by an acoustically actuated switch which is connected thereto. An example of such a switch is shown in FIG. 5 and is disclosed in U.S. patent application Ser. No. 519,573 filed on Jan. 10, 1966 by the inventors hereof. As shown in the drawing, the remote control Sonus switch comprises a receiver, generally indicated 168, having a relay 170 whose contacts 170a and 170b are closed or opened in response to signals from an acoustical transmitter 172 such as a high frequency whistle or the clapping of hands. The receiver 168 contains an acoustical receiving transducer 174 whose output is amplified by a frequency selected amplifier 176 and then rectified by a rectifier 178 prior to processing by a counting circuit 180.

The amplifier 176 includes three common-emitter transistor stages employing transistors 182, with collector load resistors 184 and base biasing resistors 186 and a power supply schematically indicated as a battery 188. The input signal for each stage is obtained by way of a coupling capacitor 190. In a representative amplifier the transistors 182, resistors 184 and 186, and coupling capacitors 190 are identical among the three stages, thereby simplifying construction and the stocking of parts.

The first stage of the amplifier 178 also includes a frequency selective negative feedback network comprising a capacitor 192 and an inductor 194 connected in parallel between the biasing resistor 186 and collector of this stage. A further capacitor 196 is in parallel with the resistor 186. The capacitor 192 and inductor 194 resonate, along with other capacitances in the inductor 194 and transistor 182, at the frequency at which the response of the amplifier is "peaked." Preferably, this is at or close to the upper end of the audible range, and in practice we have found a frequnecy of 15 kilocycles to be very satisfactory. At this frequency, negative feedback in the first stage of the amplifier 176 is negligible. At other frequencies, on the other hand, the impedance of the parallel tuned circuit is materially less, so that a substantial negative feedback signal is returned to the base of the transistors 182 by way of the capacitor 196, thereby reducing the gain of the stage at these latter frequencies. An additional drop-off in amplifier response at frequencies below the peak frequency is provided by means of the coupling capacitors 190, whose capacitances are small enough to substantially diminish the coupling of signals to the individual amplifier stages at these lower frequencies.

The rectifier 178 preferably takes the form of a voltage doubler comprising a coupling capacitor 198, a series diode 200, a shunt diode 202 and a shunt capacitor 204. These elements are followed by a series resistor 206 connected to the counting circuit 180.

The counting circuit 180 includes a pair of monostable or one-shot multivibrators 208 and 210 and a coincidence circuit generally indicated at 212 arranged to provide a signal indicative of the coincidence of the unstable states of the two multivibrators. The multivibrators 208 and 210 are essentially identical except for their time constants, the multivibrator 210 preferably having the longer time constant. Thus, each multivibrator includes a pair of grounded emitter transistors 214 and 216, with a coupling capacitor 218 connected between the collector of the transistor 214 and the base of the transistor 216 and a coupling resistor 220 between the collector of transistor 216 and the base of transistor 214. Each circuit also includes collector load resistors 222 and 224 and biasing resistors 226, 228 and 230. The collector of the transistor 216 of the multivibrator 208 is coupled to the base of the multivibrator 210 by means of a capacitor 232 followed by a voltage doubler comprising a shunt diode 236 and a series diode 234.

The coincidence circuit 212 comprises a pair of transistors 238 and 240 whose collector-emitter current paths are in series with the coil 242c of a relay 242 having normally open contacts 242a and 242b. The base of the transistor 238 is connected to receive the signal from the collector of the transistor 216 of the multivibrator 208 by way of the voltage divider comprising resistors 244 and 246. Similarly, the base of the transistor 240 receives a signal from the multivibrator 210 by way of a voltage divider comprising resistors 248 and 250. When both transistor 238 and 240 are turned on, they provide a conducting path from the battery 188 to ground by way of the relay coil 242c thereby closing the contacts 242a and 242b.

The relay 170 is an impulse type relay. Each time the current pulse passes through the coil 170c on closure of the contacts 242a and 242b, the condition of the contacts 170a and 170b is changed. That is, if the contacts are closed, the current pulse causes them to open, and if they are open, it causes them to close. Thus, the reception of two properly spaced signals within the pass band of the amplifier 176 will in the first instance cause the counting circuit 180 to close the contacts 170a and 170b to connect the transmitter, for example, to a power source 188. The reception of two more properly spaced signals will then cause the counting circuit 180 to again energize the relay 170 to open the contacts 170a and 170b, thereby disconnecting the transmitter.

In a small enclosure containing both the transducer 174 and the relays 170 and 242, the sound from the operation of the relays may falsely signal the receiver to operate in the manner described above and thereby provide an undesirable recycling of the system. For this reason we have provided a desensitizing arrangement comprising a diode 256, connected between the contact 242a and the base of the transistor 214 in the multivibrator 210, and a capacitor 258, connected between the base and ground. When the contacts 242a and 242b close, the base of the transistor 214 of the multivibrator 210 is grounded through them. This imposes the stable state on the multivibrator 210, thereby preventing conduction by the transistor 240 in the coincidence circuit 212. When the contacts 242a and 242b open as a result of the return of the multivibrator 210 to the stable state, the base of the transistor 214 in the multivibrator 210 remains at or close to ground potential until the capacitor 258 charges by way of the resistor 220 in this multivibrator. This time delay assures desensitization of the counter 180 until cessation of acoustical disturbances from the relays. The diode 256 isolates the capacitor 258 and base of the transistor 214 connected thereto from the path to the battery 188 provided by the relay coil 170.

A diode 260 across the relay coil 170 prevents arcing at the contacts 242a and 242b. A capacitor 262 connected across the transistors 238 and 240 protects these transistors against damage which might otherwise result when these transistors are turned off.

It will thus be seen that the objects set forth above among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A remote control system for an electrical appliance, said system comprising a transmitter for transmitting a continuous signal into a power line and a receiver for receiving the continuous signal from the power line and actuating the appliance in response thereto, said transmitter including a voltage dropping and rectifying section, an amplifying section, a transformer section and a ceramic filter to select a predetermined frequency, said receiver including a pair of transistors functioning as a high sensitivity amplifier tuned to said predetermined frequency, a voltage-doubler rectifier rectifying the output of said amplifier and a magnetic relay actuated in accordance with the output of said rectifier.

2. A remote control system as set forth in claim 1 wherein said transmitter has a two transistor oscillator section coupled together through a ceramic filter.

3. A remote control system as set forth in claim 2 wherein the receiver has a first voltage amplifying section and a second voltage amplifying section having a first transistor and a second transistor and the first and second voltage amplifying sections coupled together through a coding receiver generator.

4. A remote control system as set forth in claim 3 wherein the first transistor of the second voltage amplifying section is an emitter follower transistor.

5. A remote control system as set forth in claim 4 wherein the transmitter two transistor oscillator section is a low frequency oscillator.

6. A remote control system as set forth in claim 5 wherein said transmitter is actuated by an acoustical device.

7. A remote control system as set forth in claim 6 wherein said acoustical device includes a monostable circuit.

References Cited

UNITED STATES PATENTS

| | | | |
|---|---|---|---|
| 2,913,711 | 11/1959 | Polyzou et al. | 340—253 |
| 3,119,047 | 1/1964 | Michalski | 317—147 XR |
| 3,283,316 | 11/1966 | Beardmore et al. | 340—310 |
| 3,287,722 | 11/1966 | Craig | 340—310 |
| 3,334,340 | 8/1967 | McConnell | 340—310 XR |
| 3,388,389 | 6/1968 | Henriques | 340—310 XR |

LEE T. HIX, Primary Examiner

W. M. SHOOP, JR., Assistant Examiner

U.S. Cl. X.R.

307—3, 140; 317—148.5; 325—394; 340—310